A. McGARY.
CLOSET.
APPLICATION FILED NOV. 24, 1913.
1,290,615.
Patented Jan. 7, 1919.
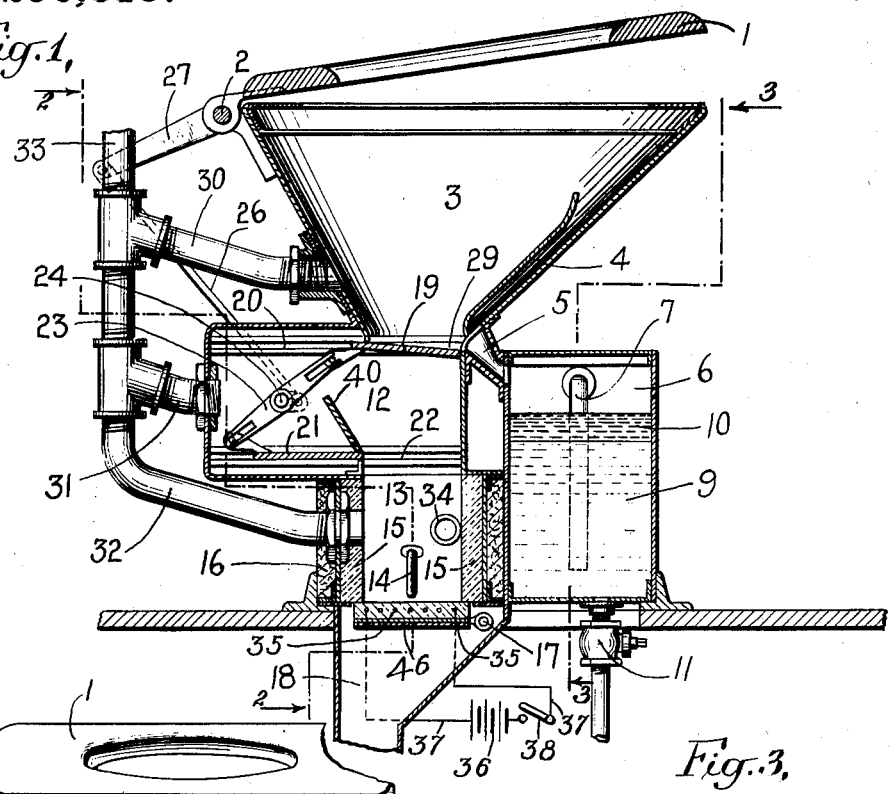
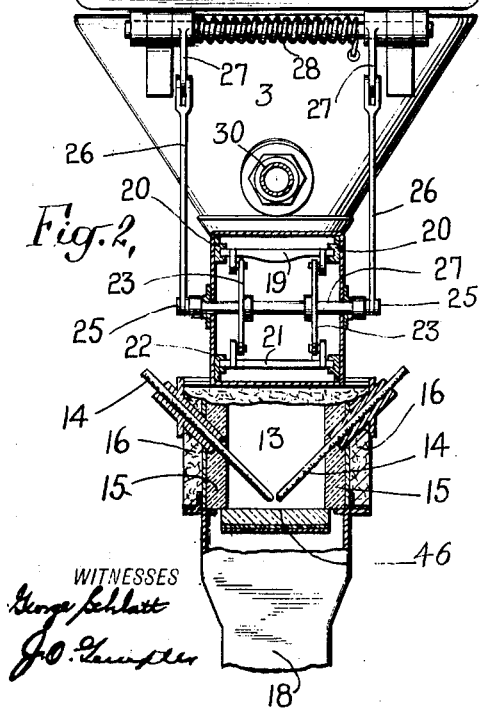
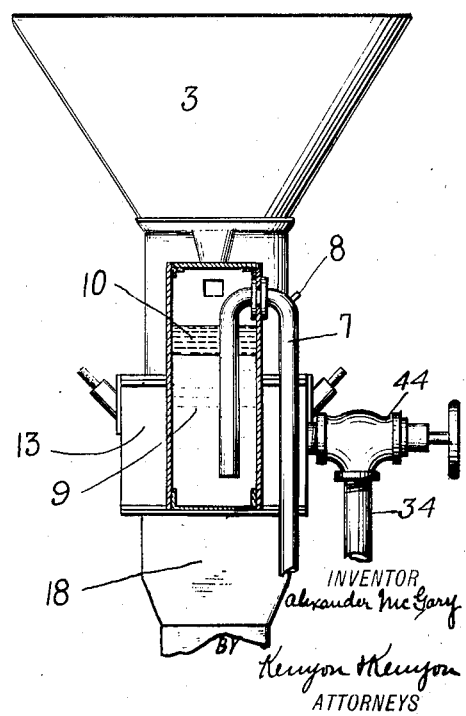
WITNESSES
George Schlatt
J. O. [illegible]
INVENTOR
Alexander McGary
BY
Kenyon & Kenyon
ATTORNEYS

UNITED STATES PATENT OFFICE.

ALEXANDER McGARY, OF NEW YORK, N. Y., ASSIGNOR, BY MESNE ASSIGNMENTS, TO GOULD COUPLER COMPANY, A CORPORATION OF NEW YORK.

CLOSET.

1,290,615.    Specification of Letters Patent.    Patented Jan. 7, 1919.

Application filed November 24, 1913. Serial No. 802,637.

*To all whom it may concern:*

Be it known that I, ALEXANDER MCGARY, a citizen of the United States, and a resident of the borough of Bronx, city, county, and State of New York, have invented certain new and useful Improvements in Closets, of which the following is a specification.

My invention relates to improvements in closets and more especially to closets adapted to be used on moving vehicles, such as railway cars, although the invention will be found adaptable and useful in other situations. The main object of the invention is to provide novel arrangements and combinations of parts whereby the same will operate in a more efficient and satisfactory manner. More specific features, objects and advantages will more clearly appear from the detailed description given below, taken in connection with the accompanying drawings, which form a part of this specification.

In the drawings:—

Figure 1 is a transverse section through an apparatus embodying my improvements in one form;

Fig. 2 is a section of the same through the lower chambers taken at right angles to that of Fig. 1; and on the line 2—2 of Fig. 1; and Fig. 3 is a section taken through the urine chamber on the line 3—3 of Fig. 1.

Referring to the drawings, 1 represents the seat of the apparatus hinged at 2. Below the seat 1 is a hopper 3 provided with a urine passage 4 at the front thereof leading to a passage 5, which in turn leads to the urine chamber 6, having an overflow outlet pipe 7 with a vent 8 therein at the top, the inner end of the outlet pipe 7 extending down in the urine 9 below a layer of liquid disinfectant 10. A valved outlet 11 leads from the bottom of the chamber 6.

Below the hopper 3 and connected therewith is a chamber 12 and below the chamber 12 and connected therewith is a heating chamber 13 provided with electrodes 14 extending downwardly therein toward one another at an angle inclined to the vertical of approximately 45°. The chamber 13 is lined with fire-brick 15 and provided with a heat insulating covering 16 extending about its sides. The bottom of the chamber 13 is closed by a door 46 pivoted at 17 and opening into a chute 18 therebeneath.

For opening and closing the connection between the hopper 3 and chamber 12, I provide a slide 19 moving in guideways 20. For opening and closing the connection between the chamber 12 and heating chamber 13, I provide a slide 21 moving in guideways 22. The chambers 13 and 12 and hopper 3 are situated directly above one another whereby they are efficiently located for effective operation. The slides 19 and 21 are operated by rocking arms 23 secured rigidly with a shaft 24 at their centers and provided with slotted ends engaging pins secured to the slides 19 and 21. At each end the shaft 24 is provided with crank arms 25 having their outer ends pivoted to links 26, the opposite ends of the links being pivoted to the outer ends of arms 27 extending rearwardly from, and rigidly secured to the seat 1. A spring 28 normally tends to lift the seat 1 and at the same time, through the connecting parts 27, 26, 25, 24 and 23, cause the slide 19 to close the opening between the hopper 3 and chamber 12 and the slide 21 to open the opening between the chamber 12 and heating chamber 13.

The top of the slide 19 is provided with a conduit or channel 29 which when the slide is closed will conduct any liquid matter to the passage 5. Three inclined vent pipes 30, 31 and 32 extend outwardly and upwardly from the hopper 3, chamber 12 and heating chamber 13, respectively, and connect with a common exhaust vent pipe 33 which is substantially vertical. In order to provide a draft when required, a vent pipe 34 having a shut-off valve 44 therein is led into the heating chamber 13, as shown in Figs. 1 and 3. The chamber 13 is provided with auxiliary heating means comprising electrical resistance wires 35 situated in the door 16 and adapted to be connected in circuit with a battery 36, conductors 37 and switch 38, as shown diagrammatically in Fig. 1, so that in case of the failure of the electrodes to produce the proper arc to burn the excreta, the switch 38 may be closed and thus cause the excreta to be heated or burned or dried by means of the electrical resistance 35, for more sanitary and easy removal.

When one uses the apparatus the seat is depressed which automatically causes the slide 19 to open the connection between the hopper 3 and chamber 12 and close the connection between the chamber 12 and heating chamber 13, so that if the chamber 13 be still hot it will be shut off from the hopper. Upon one leaving the seat the spring 28 causes the same to rise so as to cause the slide 19 to close the opening between the hopper 3 and chamber 12, while the slide 21 is drawn back and the excreta scraped therefrom by a stationary scraper 40 so that it drops into the heating chamber 13 where it is consumed by the arc produced by the electrodes 14. The current for the arc may be automatically turned on and off in any well known manner or as described in my co-pending application for Letters Patent, Serial No. 782,784, filed August 4, 1913.

Having fully and clearly described my various improvements, what I claim as new and desire to secure by Letters Patent, is:—

1. In an apparatus of the class described the combination of a hopper, a chamber below the hopper and communicating therewith for receiving excreta, a heating chamber below the first chamber and communicating with the first chamber, means for opening and closing the communication between the first chamber and the hopper, and means for opening and closing the communication between the heating chamber and the first chamber and interlocked with the first named means whereby one communication is opened and the other closed, a seat in operative relation to the hopper and with said last named means whereby a depression of the seat will operate said means.

2. In an apparatus of the class described, the combination of a hopper, a chamber below the hopper, and connected therewith for receiving excreta, a heating chamber below the first chamber and connected with the first chamber, means for opening and closing the connection between the first chamber and hopper, means for opening and closing the connection between the heating chamber and the first chamber, and means for automatically operating said means to open one connection and close the other connection.

3. In an apparatus of the class described, the combination of a hopper, a chamber below the hopper, and connected therewith for receiving excreta, a heating chamber below the first chamber and connected with the first chamber, means for opening and closing the connection between the first chamber and hopper, means for opening and closing the connection between the heating chamber and the first chamber, and means for automatically operating said means to open and close said connections upon one using and leaving the apparatus.

4. In an apparatus of the class described, the combination of a hopper, a chamber below the hopper, and connected therewith for receiving excreta, a heating chamber below the first chamber and connected therewith, slides for opening and closing the connections between the first chamber and hopper and between the first chamber and heating chamber and means controlled by one using and leaving the apparatus for operating said slides.

5. The combination of a seat, a hopper below the seat, a chamber below the hopper and connected therewith, a heating chamber below the first chamber and connected therewith, slides for opening and closing said connections, and means controlled by the movement of the seat for causing one slide to close the upper connection when one leaves the apparatus and to open the upper connection when one uses the seat, and for causing the other slide to open the lower connection when one leaves the apparatus.

6. The combination of a seat, a hopper below the seat, a chamber below the hopper and connected therewith, a heating chamber below the first chamber and connected therewith, slides for opening and closing said connections, and automatic means for causing one slide to close the upper connection when one leaves the apparatus and to open the upper connection when one uses the seat, and for causing the other slide to open the lower connection when one leaves the apparatus.

7. The combination of a seat, a hopper below the seat, a chamber below the hopper and connected therewith, a slide for opening and closing said connection, and a discharge conduit for urine, said slide having a conduit for urine leading to said discharge conduit when the slide closes the connection.

8. The combination of a seat, a hopper below the seat, a chamber below the hopper and connected therewith, a heating chamber below the first chamber and connected therewith, means for opening and closing the connections between the first chamber and the hopper and the first chamber and the heating chamber, and a pivoted door for closing the bottom of the heating chamber.

9. The combination of a seat, a hopper below the seat, a chamber below the hopper and connected therewith, a heating chamber below the first chamber and connected therewith, means for opening and closing the connections between the first chamber and the hopper and the first chamber and the heating chamber, and means for opening and closing the bottom of the heating chamber.

10. The combination of a seat, a hopper below the seat, a heating chamber below the hopper and connected therewith and means for opening and closing the connection between the hopper and chamber, said chamber being provided with a lining of fire brick and a heat-insulation covering about its sides.

11. The combination of a seat, a hopper below the seat, a heating chamber below the hopper and connected therewith, said chamber being provided with electrodes for producing an electric arc to burn the excreta, and also being provided with a lining of fire brick, automatic slides for opening and closing the connection between the hopper and the chamber, and a heat insulation covering about its sides.

12. In an apparatus of the class described, the combination of a hopper, a heating chamber below the hopper provided with heating means for burning the excreta, means for automatically controlling said heating means to turn the heat on and off when the apparatus is used, and auxiliary heating means for said chamber adapted to be used on failure of said first-mentioned heating means.

13. In an apparatus of the class described, the combination of a hopper, a heating chamber below the hopper provided with heating means for burning the excreta and auxiliary heating means for said chamber, said auxiliary heating means comprising an electrical resistance in the bottom of the heating chamber.

14. In an apparatus of the class described, the combination of a hopper, a heating chamber below the hopper provided with electrodes for producing an electric arc to burn the excreta and auxiliary heating means in the bottom of said chamber.

15. In an apparatus of the class described, the combination of a hopper, a heating chamber below the hopper provided with electrodes for producing an electric arc to burn the excreta, and auxiliary heating means in said chamber, said auxiliary heating means comprising an electrical resistance in the bottom of the heating chamber.

16. In an apparatus of the class described, the combination of a hopper, a heating chamber below the hopper provided with heating means for burning the excreta, said heating chamber having a pivoted bottom door, and auxiliary heating means for the chamber comprising an electrical heating resistance in said door.

17. In an apparatus of the class described, the combination of a hopper, a chamber below the hopper and connected therewith, a heating chamber below the first chamber and connected therewith, means for opening and closing the connection between the hopper and first chamber, a slide for opening and closing the connection between the heating chamber and first chamber, automatic means for causing the said means to close the first connection and open the second connection on one leaving the apparatus, and a scraper operating in conjunction with the slide to deposit the excreta into the heating chamber.

18. In a device of the class described, a hopper, a chamber below said hopper and communicating therewith, said hopper having a urine outlet from the lower portion thereof, and means for cutting off communication between said hopper and chamber and directing urine into said outlet.

In testimony whereof, I have signed my name to this specification, in the presence of two subscribing witnesses.

ALEXANDER McGARY.

Witnesses:
 GORHAM CROSBY,
 EDWIN SEGER.